United States Patent
Paquin (10) Patent No.: US 10,590,945 B2
(45) Date of Patent: Mar. 17, 2020

(54) FIBER COMPOSITE MATERIAL AND PREFORM AND FAN BLADE MADE THEREFROM

(71) Applicant: United Technologies Corporation, Farmington, CT (US)

(72) Inventor: Bradley L. Paquin, Cheshire, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 685 days.

(21) Appl. No.: 15/233,493

(22) Filed: Aug. 10, 2016

(65) Prior Publication Data

US 2018/0045207 A1 Feb. 15, 2018

(51) Int. Cl.
*F04D 29/02* (2006.01)
*B32B 27/38* (2006.01)
(Continued)

(52) U.S. Cl.
CPC ............ *F04D 29/023* (2013.01); *B29B 11/16* (2013.01); *B29C 70/08* (2013.01); *B29C 70/22* (2013.01);
(Continued)

(58) Field of Classification Search
CPC ......... B29C 70/08; B29C 70/24; B29C 70/22; B32B 2603/00; B32B 5/24; B32B 2260/023; B32B 2260/046; B32B 2262/0253; B32B 2262/0261; B32B 2262/0276; B32B 2262/12; B32B 2307/50; B32B 2307/732; B32B 27/08; B32B 3/263; B32B 5/022; B32B 5/024; B32B 5/04; B32B 5/12; B32B 5/26; C08J 2363/00; C08J 2379/08; C08J 5/047; C08J 5/24; D03D 25/005; D03D 25/00; D06M 15/55; D06M 15/59; D06M 2101/40; D06M 2101/36; D06M 2101/20; D06M 2101/32; D10B 2101/12; D10B 2331/021; D10B 2505/02; D10B 2321/022; D10B 2331/04; F01D 5/282; F04D 29/38; F05D 2220/36; F05D 2240/30; F05D 2300/30; F05D 2300/43; F05D 2300/6034; F05D 2300/0034; B29B 11/16
(Continued)

(56) References Cited

U.S. PATENT DOCUMENTS 5,279,879 A 1/1994 Takezawa et al.
8,696,319 B2 4/2014 Naik
(Continued)

FOREIGN PATENT DOCUMENTS

GB 1245324 A 9/1971

OTHER PUBLICATIONS

European Search Report for European Application No. 17185737.8 dated Feb. 8, 2018, 8 pages.

*Primary Examiner* — Camie S Thompson
(74) *Attorney, Agent, or Firm* — Cantor Colburn LLP (57) ABSTRACT

A fiber composite material comprises a polymer matrix, carbon fibers, and non-carbon fibers, wherein the non-carbon fibers have a strain to failure value greater than the strain to failure value of the carbon fibers. Also discussed is a preform comprising the fiber composite material combined in a three dimensionally woven structure. Also discussed is a fan blade for a jet engine.

16 Claims, 5 Drawing Sheets

(51) Int. Cl.

| | |
|---|---|
| *B29C 70/24* | (2006.01) |
| *B32B 5/12* | (2006.01) |
| *C08J 5/04* | (2006.01) |
| *B32B 27/08* | (2006.01) |
| *C08J 5/24* | (2006.01) |
| *B32B 5/26* | (2006.01) |
| *B32B 5/02* | (2006.01) |
| *B29C 70/08* | (2006.01) |
| *B32B 3/26* | (2006.01) |
| *B29B 11/16* | (2006.01) |
| *B32B 27/28* | (2006.01) |
| *F01D 5/28* | (2006.01) |
| *B29C 70/22* | (2006.01) |
| *B32B 5/04* | (2006.01) |
| *B32B 5/24* | (2006.01) |
| *D03D 25/00* | (2006.01) |
| *D06M 15/55* | (2006.01) |
| *D06M 15/59* | (2006.01) |
| *F04D 29/38* | (2006.01) |
| *D06M 101/20* | (2006.01) |
| *D06M 101/32* | (2006.01) |
| *D06M 101/36* | (2006.01) |
| *D06M 101/40* | (2006.01) |

(52) U.S. Cl.
CPC .............. *B29C 70/24* (2013.01); *B32B 3/263* (2013.01); *B32B 5/022* (2013.01); *B32B 5/024* (2013.01); *B32B 5/04* (2013.01); *B32B 5/12* (2013.01); *B32B 5/24* (2013.01); *B32B 5/26* (2013.01); *B32B 27/08* (2013.01); *B32B 27/281* (2013.01); *B32B 27/38* (2013.01); *C08J 5/047* (2013.01); *C08J 5/24* (2013.01); *D03D 25/005* (2013.01); *D06M 15/55* (2013.01); *D06M 15/59* (2013.01); *F01D 5/282* (2013.01); *F04D 29/38* (2013.01); *B32B 2260/023* (2013.01); *B32B 2260/046* (2013.01); *B32B 2262/0253* (2013.01); *B32B 2262/0261* (2013.01); *B32B 2262/0269* (2013.01); *B32B 2262/0276* (2013.01); *B32B 2262/106* (2013.01); *B32B 2262/12* (2013.01); *B32B 2307/50* (2013.01); *B32B 2307/544* (2013.01); *B32B 2307/732* (2013.01); *B32B 2603/00* (2013.01); *C08J 2363/00* (2013.01); *C08J 2379/08* (2013.01); *D06M 2101/20* (2013.01); *D06M 2101/32* (2013.01); *D06M 2101/36* (2013.01); *D06M 2101/40* (2013.01); *D10B 2101/12* (2013.01); *D10B 2321/022* (2013.01); *D10B 2331/021* (2013.01); *D10B 2331/04* (2013.01); *D10B 2505/02* (2013.01); *F05D 2220/36* (2013.01); *F05D 2240/30* (2013.01); *F05D 2300/30* (2013.01); *F05D 2300/43* (2013.01); *F05D 2300/6034* (2013.01); *Y02T 50/672* (2013.01)

(58) Field of Classification Search
USPC ....... 428/113, 408, 902, 300.4, 297.4, 301.4, 428/299.1; 442/342, 343
See application file for complete search history.

(56) References Cited

U.S. PATENT DOCUMENTS

| | | |
|---|---|---|
| 8,998,134 B2 | 4/2015 | Fews et al. |
| 2003/0203179 A1 | 10/2003 | Hawkins et al. |
| 2003/0217780 A1 | 11/2003 | Uchida |
| 2005/0006023 A1 | 1/2005 | Johnson et al. |
| 2010/0101130 A1* | 4/2010 | Boyce ............... B29C 45/14631 40/607.01 |
| 2015/0336333 A1* | 11/2015 | Bonner ................. B29C 70/465 442/202 |
| 2016/0003060 A1 | 1/2016 | Cook |
| 2016/0076552 A1 | 3/2016 | Anderson et al. |

* cited by examiner

FIBER COMPOSITE MATERIAL AND PREFORM AND FAN BLADE MADE THEREFROM

BACKGROUND

This disclosure relates to fan blades that utilize composite materials and modifications to the composite material to reduce damage from the impact of objects striking the fan blades, such as birds.

Fan blades for gas turbine engines are typically designed to meet regulations relating to the impact of foreign objects against the fan blades while in operation. For example, regulations require a commercial airline engine to be capable of ingesting a medium-sized bird while allowing for continued operation or safe and orderly shutdown of that engine. Further, regulations also require that fan blades must resist cracking from nicks and dents caused by small debris such as sand and rain.

The design requirements may be especially challenging for fan blades constructed of fiber composite materials that may be less ductile than fan blades formed of metallic alloys. Fiber composite fan blades must have a greater thickness than metal or titanium fan blades to meet the bird strike regulations due to low strain tolerance of fiber composites. However, increasing the blade thickness reduces fan efficiency and offsets a significant portion of weight savings gained from using fiber composite materials.

Accordingly, it is desirable to provide a fiber composite material with greater strain tolerance and a fan blade comprising the fiber composite material with greater strain tolerance.

SUMMARY

Disclosed herein is a fiber composite material comprising a polymer matrix, carbon fibers, and non-carbon fibers, wherein the non-carbon fibers have a strain to failure value greater than the strain to failure value of the carbon fibers.

In addition to one or more of the features described above, or as an alternative, further embodiments of the fiber composite material may include the non-carbon fiber having a strain to failure value greater than 1.5%. Further embodiments include the carbon fiber having a diameter of 3 to 10 micrometers. Further embodiments include the non-carbon fiber present in an amount of 1 to 5 volume percent, based on the total fiber volume in the fan blade. Further embodiments include the non-carbon fiber comprising aramid fibers, hollow polypropylene fibers, polyamide fibers, polyester fibers, or a combination comprising two or more of the foregoing. Further embodiments include the carbon fiber and the non-carbon fiber combined in a woven fabric, a uniweave, or a three dimensionally woven structure. Further embodiments include the polymer matrix comprising an epoxy, a polyimide or a combination thereof.

According to another embodiment a preform comprises a polymer matrix, carbon fibers, and non-carbon fibers combined in a three dimensionally woven structure having yarns extending in the X, Y and Z directions, wherein the yarns extending in the Z direction comprise non-carbon fibers and the non-carbon fibers have a strain to failure value greater than the strain to failure value of the carbon fibers.

In addition to one or more of the features described above, or as an alternative, further embodiments of the preform may include non-carbon fiber having a strain to failure value greater than 1.5%. The non-carbon fiber may present in an amount of 1 to 5 volume percent, based on the total fiber volume in the preform.

According to another embodiment a fan blade for a jet engine, the fan blade comprises a root connected to a blade portion, the blade portion including a leading edge and a trailing edge, wherein the root, the blade portion or both comprise a fiber composite and the fiber composite comprises carbon fibers, non-carbon fibers having a strain to failure value greater than the strain to failure value of the carbon fibers and a polymer matrix.

In addition to one or more of the features described above, or as an alternative, further embodiments of the fan blade for a jet engine may include non-carbon fiber having a strain to failure value greater than 1.5%. The carbon fiber may have a diameter of 3 to 10 micrometers. The non-carbon fiber may be present in an amount of 1 to 5 volume percent, based on the total fiber volume in the fan blade. The non-carbon fiber may comprise aramid fibers, hollow polypropylene fibers, polyamide fibers, polyester fibers, or a combination comprising two or more of the foregoing. The carbon fiber and the non-carbon fiber may be comingled in a yarn, a woven fabric, a uniweave, a three dimensionally woven structure. The polymer matrix may comprises an epoxy, a polyimide, or a combination thereof. In some embodiments, 30 vol % of the total non-carbon fiber used in the fan blade is located within 10 millimeters of the surface of the fan blade.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

As shown and described herein, various features of the disclosure will be presented. Various embodiments may have the same or similar features and thus the same or similar features may be labeled with the same reference numeral, but preceded by a different first number indicating the Figure Number to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

As discussed above, fiber composite materials comprising carbon fiber have less ductility than metal materials. As a result they show brittle type failure on impact as opposed to a ductile type failure. The fiber composite material described herein has greater ductility than a comparable fiber composite made using only carbon fibers. The inclusion of non-carbon fibers having a higher strain to failure value than the carbon fibers improves the overall ductility of the composite. "Strain to failure", as used herein, refers to the amount of fiber elongation at the point of failure. Without being bound by theory, it is believed that by using a mixture of carbon fiber and non-carbon fiber the failure mode of the composite overall will change and become more ductile due to the increased overall elasticity of the fibers. The improved ductility also implies that more energy will be absorbed prior to failure. The improved ductility of the carbon fiber material makes it useful in the fabrication of fan blades for gas turbine engines. Fan blades made from the fiber composite material described herein have a greater resistance to damage from the impact of birds and small objects.

Figure 1:
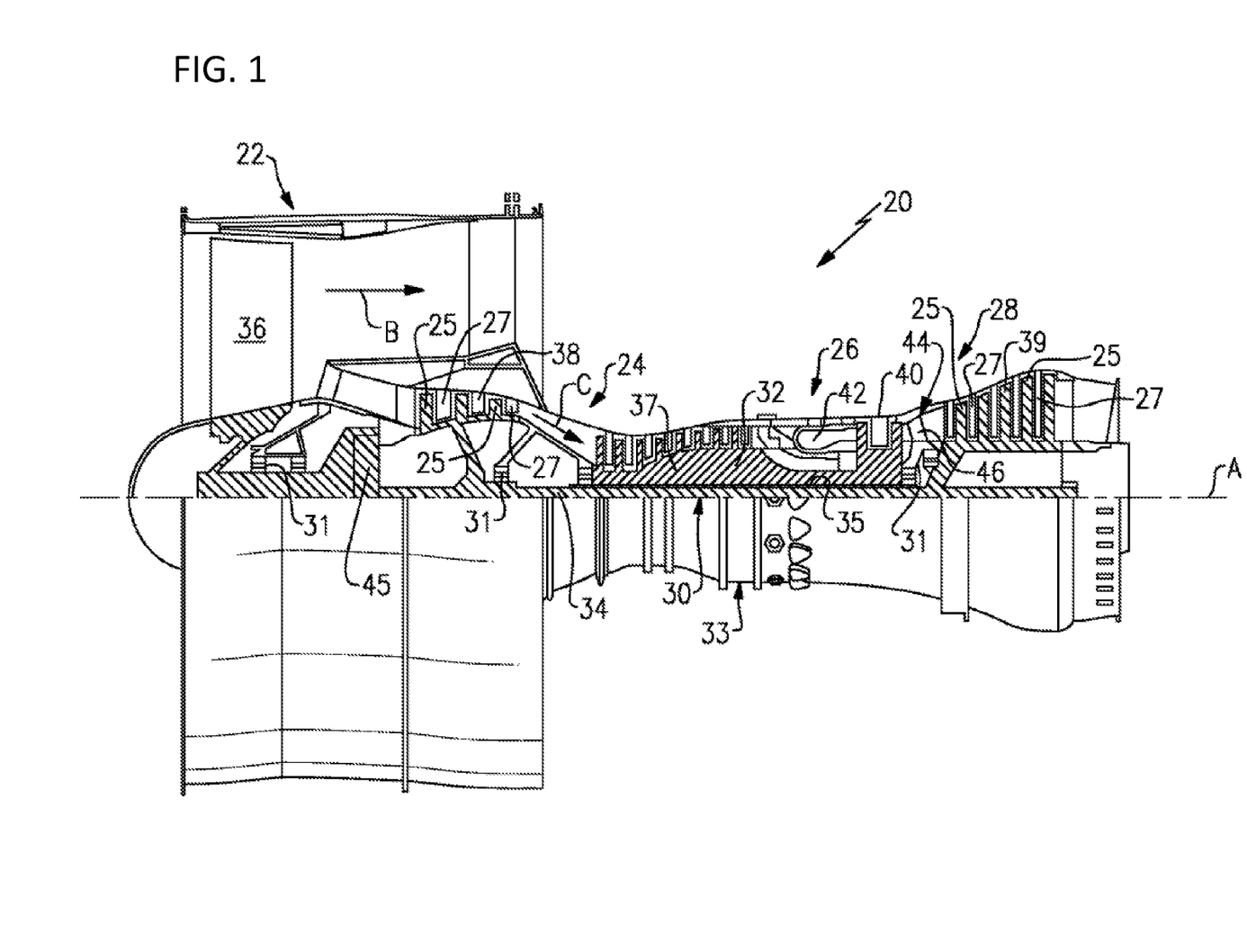
FIG. 1 is a schematic cross-sectional illustration of a gas turbine engine that may employ various embodiments disclosed herein.

A fan blade is part of a gas turbine engine. FIG. 1 schematically illustrates a gas turbine engine 20. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26 using blades 25 and vanes 27. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

Figure 2:
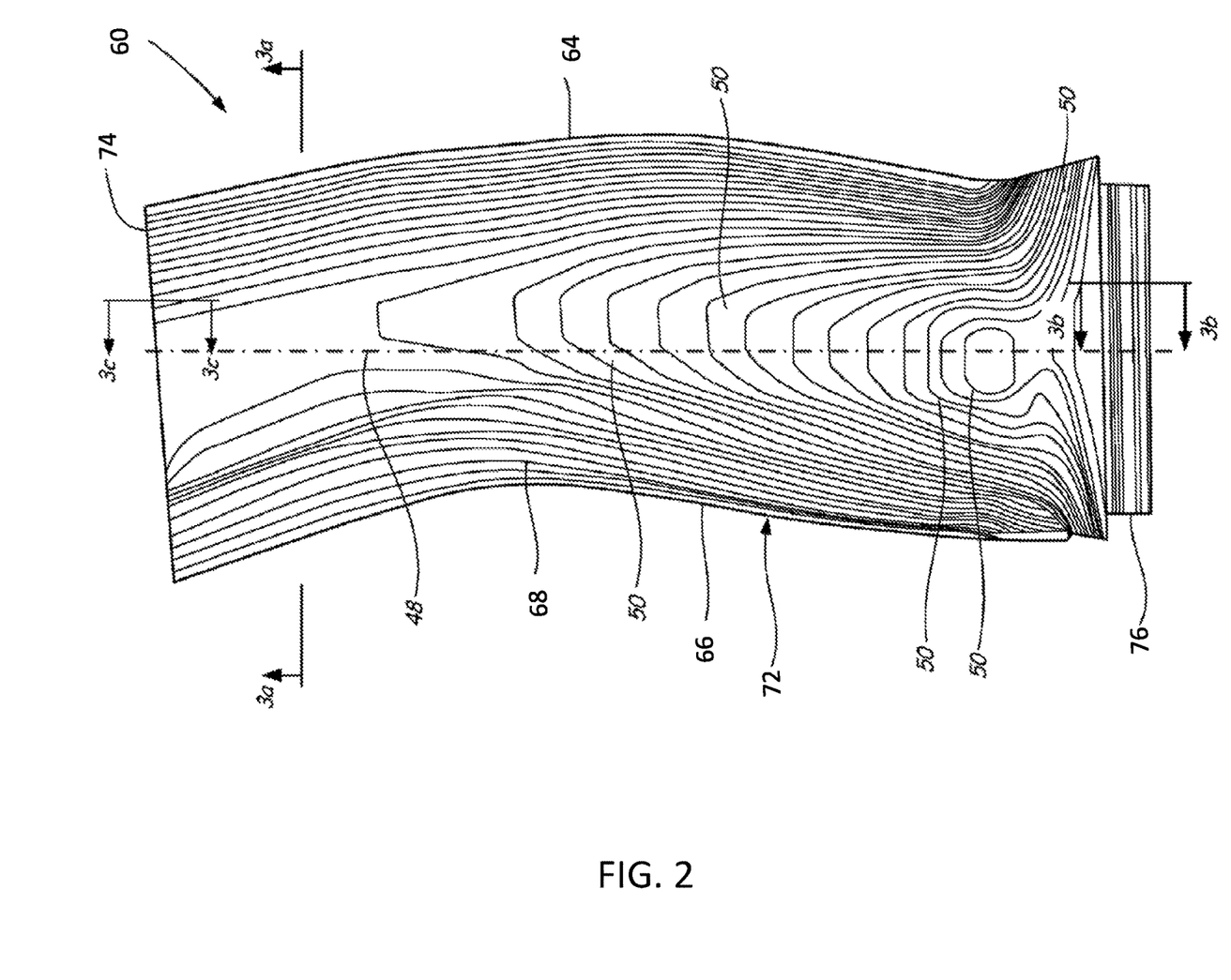
FIG. 2 is a side view of a composite fan blade.

The fan section 22 comprises a plurality of composite blades 60 as shown in FIG. 2. FIG. 2 illustrates one composite blade 62, which includes leading edge 64, trailing edge 66, pressure side 68, suction side 70 (shown in FIG. 3a), airfoil 72 (having tip 74), root 76, longitudinal axis 78 and plies 50. Root 76 is illustrated as a dovetail root. However, root 76 can have any configuration. In some embodiments the leading edge can be metallized. Longitudinal axis 78 extends in the spanwise direction from root 76 to tip 74. The composite fan blade 60 can be made using plies 50, preform 52 or a combination thereof as described below.

The plies, preform or both comprises a fiber composite material. The fiber composite material comprises a matrix disposed about carbon fibers and non-carbon fibers. The non-carbon fibers have a higher strain to failure value than the carbon fibers.

The matrix disposed above the fibers can comprise a thermoplastic or a thermoset. Exemplary materials include epoxies and polyimides. The matrix can additionally comprise an elastomer which may also be a thermoplastic or thermoset.

The carbon fiber can comprise any carbon fiber or combination of carbon fibers. When a combination of carbon fibers is used the non-carbon fiber has a strain to failure value greater than the highest strain to failure value for the combination of carbon fibers. Strain to failure values can be determined according to ASTM D4018-11 for carbon fiber. Strain to failure values can be determined according to ASTM D2343-09 for the non-carbon fibers.

Exemplary carbon fibers include low modulus carbon fibers (modulus of elasticity below about 200 giga-Pascals (GPa)), standard modulus carbon fibers (modulus of elasticity between about 200 GPa and 250 GPa), intermediate modulus carbon fibers (modulus of elasticity between about 250 GPa and 325 GPa) and high modulus carbon fibers (modulus of elasticity greater than 325 GPa). Carbon fibers have a strain to failure value less than or equal to 2.0%, or, less than or equal to 1.5%.

The carbon fiber can have a diameter of 3 to 10 micrometers, or, 4 to 8 micrometers.

The non-carbon fiber has a strain to failure value greater than the strain to failure value of the carbon fiber. In some embodiments, the non-carbon fiber has a strain to failure value greater than 1.5% or, greater than or equal to 2.0%. In some instances, the non-carbon fiber has a strain to failure greater than or equal to 2.5%, or, greater than or equal to 2.8%, or, greater than or equal to 6%, or, greater than or equal to 8%. The non-carbon fiber can have a strain to failure less than or equal to 15%. Exemplary non-carbon fibers include aramid fibers, hollow polypropylene fibers, polyamide fibers, polyester fibers, or a combination comprising two or more of the foregoing. It is expressly contemplated that when two different types of non-carbon fibers are used the distribution of each type of non-carbon fiber can be tailored to result in the desired properties in the fiber composite material. The non-carbon fiber is defined as excluding glass fiber.

The non-carbon fiber can be present in an amount of 1 to 5 volume percent, based on the total fiber volume in the fan blade. Within this range the amount of non-carbon fiber can be 1.5 to 45, or 2 to 4 volume percent.

The non-carbon fiber can have a diameter of 5 to 75 micrometers, or, 10 to 60 micrometers.

The carbon fiber, the non-carbon fiber or both may further comprise a sizing applied to the fiber. The sizing may be the same or different on each type of fiber. In some embodiments some or all of the sizing is reactive with the matrix. When different sizings are used they may be reactive with each other, the matrix or both.

The carbon fiber and the non-carbon fiber may be combined in a woven fabric, a uniweave, a three dimensionally woven structure, or a combination thereof. It is also contemplated that the distribution of the non-carbon fiber can be chosen to optimize the properties of the final article. For example, it may be advantageous to locate a higher density of non-carbon fiber near the surface of an article to help absorb impact energy and have a lower density of non-carbon fiber in the core to enhance mechanical properties in strength critical areas. In some embodiments 25-35 vol % of the total non-carbon fiber used in the fan blade is located within 10 millimeters of the surface of the fan blade. It is also contemplated that 25-35 vol % of the total non-carbon fiber can be located with 10% of the surface based on the total width of the article.

In a woven fabric, half of the fibers are orientated in a first direction and the other half of the fibers are oriented 90° to the first direction. For example, half of the fibers of a 0/90° Woven fabric are oriented along the longitudinal axis and the other half of the fibers are oriented along the chordwise axis, perpendicular to the longitudinal axis. Similarly, half of the fibers of a +/−45° woven fabric are oriented at +45° from the longitudinal axis and the other half of the fibers are oriented at −45° from the longitudinal axis. In one example, the woven fabric is a 5 harness satin (5HS) material. A woven fabric is substantially planar and may be used in plies as described below.

A uniweave material has about 93-98% if its fibers oriented along longitudinal axis of the material. The longitudinal fibers may comprise both carbon and non-carbon fibers. A small number of fibers extend perpendicular to the longitudinal axis and stitch the uniweave material together. In a uniweave it is contemplated that the fibers extending perpendicular to the longitudinal axis comprise non-carbon fiber. In some embodiments, the fibers extending perpendicular to the longitudinal axis consist of non-carbon fiber.

A three dimensionally woven structure (also referred to as a preform) comprises warp yarns and weft yarns. The warp yarns and weft yarns are formed from bundles of fibers. Each individual yarn has a constant number of fibers extending the length of the yarn. The filament counts of yarns are referred to as the yarn sizes. It is noted that in an untensioned state, the yarn size is proportional to the diameter of the yarn. The larger the yarn size, the larger the diameter of yarn. During the weaving process, yarns can become elliptical in cross-sectional shape or may have a non-circular cross-sectional shape. Warp yarns and weft yarns are woven together to form integrally woven three-dimensional structure with a layer-to-layer angle interlock weave pattern. Alternatively, structure can have a through-thickness angle interlock weave pattern or an orthogonal weave pattern.

The three dimensionally woven structure has yarns extending in the X, Y and Z directions. The yarns extending in the Z direction comprise non-carbon fibers. In some embodiments the yarns extending in the Z direction consist of non-carbon fibers. It is also contemplated that the yarns extending in the X or Y directions may comprise or consist of non-carbon fibers. For example, the yarns extending the X direction may comprise or consist of non-carbon fibers while the yarns extending in the Y direction are free of non-carbon fibers. It is also contemplated that the distribution of the non-carbon fibers over the Z direction may vary with a greater amount near the surface of the fan blade.

Figure 5:
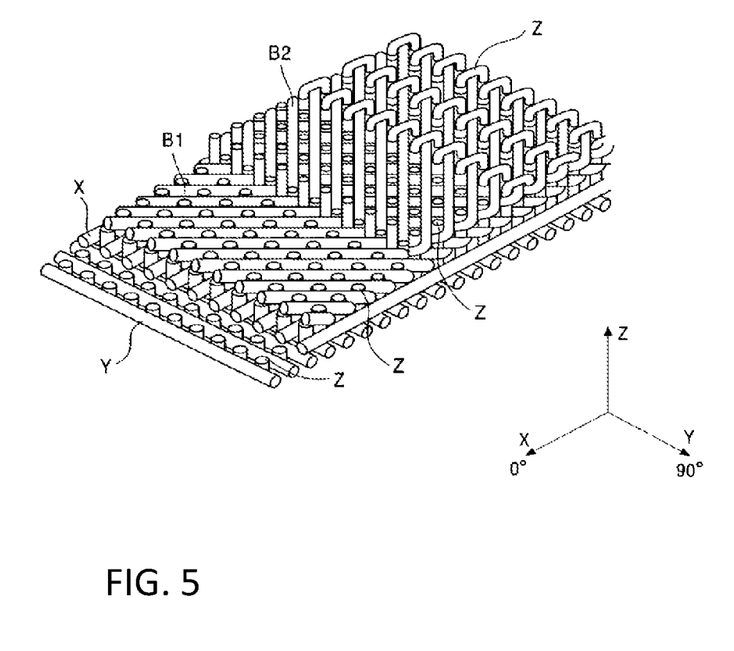
FIG. 5 is a schematic partly exploded perspective view showing an example of a three dimensional woven fabric.

An exemplary three dimensionally woven structure is shown in FIG. 5. FIG. 5 is a schematic of a partially exploded perspective view of a four axis material comprising warps X, wefts Y, and bias yarns B1 and B2 with vertical stitching yarns Z.

The woven fabric, uniweave material and the preform can be combined with the matrix in any suitable manner. In some embodiments the woven fabric, uniweave material or the preform may be a prepreg. In a prepreg the matrix is a curable resin (a thermoset precursor) and the prepreg comprises the fiber component (woven fabric, uniweave material or preform), a curable resin and an optional curing agent. The prepreg remains workable until cured to form a thermoset matrix.

In some embodiments the woven fabric, uniweave material, preform or a combination thereof are oriented and arranged as desired and a thermoplastic polymer is added to the fibrous material. In some embodiments the fibrous material is arranged in a mold and the thermoplastic is injected into the mold. It is also contemplated that the fibrous material can be wetted with a prepolymer (a polymer having less than the final molecular weight) and then treated to complete the molecular weight build to form the matrix. The fibrous material wetted with the prepolymer can be manipulated to form the desired shape of the final article and then treated to form the matrix. The type of treatment will depend upon the identity of the matrix polymer and prepolymer.

In some embodiments the composite fan blade is made using a combination of a preform and woven fabric or uniweave material. It is also contemplated that a non-woven material may be used. As shown in FIG. 2, plies 50 can be used to form the composite fan blade. Plies 50 are two-dimensional fabric skins. Elongated fibers extend through plies 50 at specified orientations and give plies 50 strength. Plies 50 can vary in size, shape and fiber orientation. Plies 50 can comprise a woven fabric or a uniweave material. Plies may also comprise a non-woven material. In a non-woven material the non-carbon fiber would be employed to needle the non-woven mat.

The design or ply layup of plies 50 can be controlled to manage the locations of specific materials and to manage the locations of the edges of plies 50, particularly the leading and trailing edges 64 and 66 of plies 50. A ply drop is formed at the edge of each ply 50. Ply drops provide initiation sites for damage and cracks. The weakest region for laminated composites is the interlaminar region between the laminates. High interlaminar shear stresses, such as from operational loads and foreign object strikes, in a laminated composite can cause delamination that compromises the structural integrity of the structure. The ply drops in composite blade 62 are staggered and spread apart to prevent crack/delamination propagation. In one example, the ply drops in composite blade 62 are arranged to have a 20:1 minimum ratio of ply drop distance to ply thickness.

Plies 50 enable tailoring the structural properties of composite blade 32. Particularly, plies 50 enable tailoring the strength and stiffness of different regions of the blade. For example, additional torsional stiffness can be added to a region of blade 62 by using plies 50 having off-axis fibers. While the bending stiffness of another region of blade 62 can be increased by using plies 50 having spanwise oriented fibers. The non-carbon fiber content of the plies offer an additional method of tailoring the structural properties.

Figure 3A:
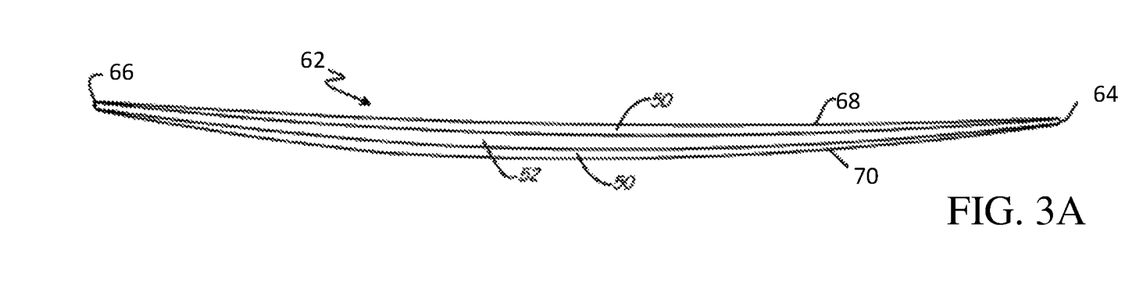
FIGS. 3a, 3b, and 3c are cross-sectional views of the composite fan blade of FIG. 2 taken along line 3a-3a, line 3b-3b and line 3c-3c, respectively.
Figure 3B:
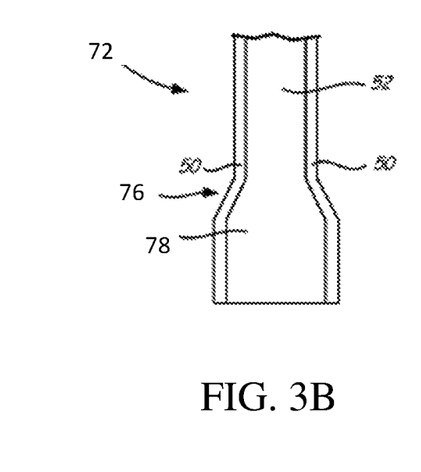
Figure 3C:
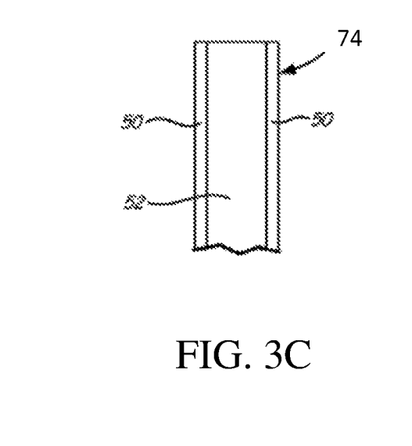

FIGS. 3a, 3b and 3c are cross-sectional views of composite blade 62 taken along line 3a-3a, line 3b-3b and line 3c-3c, respectively. As shown, composite blade 62 includes woven core or preform 52 and plies 50. Preform 52 is a three-dimensional woven core formed from a plurality of yarns as described further below. Preform 52 extends the spanwise length of composite blade 62 from root 76 to tip 74. Preform 52 also extends the chordwise width of composite blade 62 from leading edge 64 to trailing edge 66. The shape of preform 52 generally follows the shape of blade 62.

A first filament reinforced airfoil ply section on pressure side 68 of blade 62 comprises a plurality of plies 50, and a second filament reinforced airfoil ply section on suction side 70 comprises a plurality of plies 50. First and second filament reinforced airfoil ply sections are represented by a single ply 50 although each section comprises a plurality of plies 50 as illustrated in FIG. 2.

Preform 52 is a woven three-dimensional preform formed of a plurality of yarns. Preform 52 extends through composite blade 62 and is located between plies 50 on pressure side 68 and plies 50 on suction side 70. Preform 52 can extend in the spanwise direction from root 76 to tip 74 and can extend in the chordwise direction from leading edge 64 to trailing edge 66. The number of yarns, types of yarns and weave pattern of preform 52 can be tailored to achieve the desired the properties of composite blade 62.

FIG. 3b illustrates the dovetail shape of root 76. Dovetail root 76 has a divergent shape such that root 76 is thicker than airfoil 72. Composite blade 62 (and thus preform 52) is connected to the fan mechanism by root 76. The additional thickness of root 76 enables composite blade 62 to withstand forces from standard operation and from foreign object impacts. Plies 50 can extend the length of root 76 as shown. Alternatively, plies 50 can end before root 76 so that root 76 is formed only by preform 52.

FIG. 3c is an enlarged cross-sectional view of composite blade 62 at tip 74. As shown, preform 52 can extend to the end of tip 74. Composite blade 62 can have a relatively constant thickness at tip 74. Alternatively, the thickness of blade 62 can decrease with increasing distance from root 76. The change in thickness can be accomplished by decreasing the thickness of plies 50, the thickness of preform 52 or both.

To form composite blade 62, preform 52 and plies 50 are stacked in a mold, injected with resin and cured. Example resins include but are not limited to epoxy resins and epoxy resins containing an additive, such as rubber. Alternatively, airfoil plies 50 can be pre-impregnated composites, (i.e. "prepregs") such that resin is not directly added to the mold.

Plies 50 are stacked on either side of preform 52 according to a ply layup. Typically the ply layup on pressure side 68 is a mirror image of the ply layup on suction side 70 of blade 62. Plies 50 tailor the surface of preform 52 to form the exterior surface profile of blade 32. Plies 50 also provide strength. Depending on the design, plies 50 may not be present at root 76. Root 76 of preform 52 can be tailored to a desired thickness without plies 50 adding the additional thickness.

Figure 4:
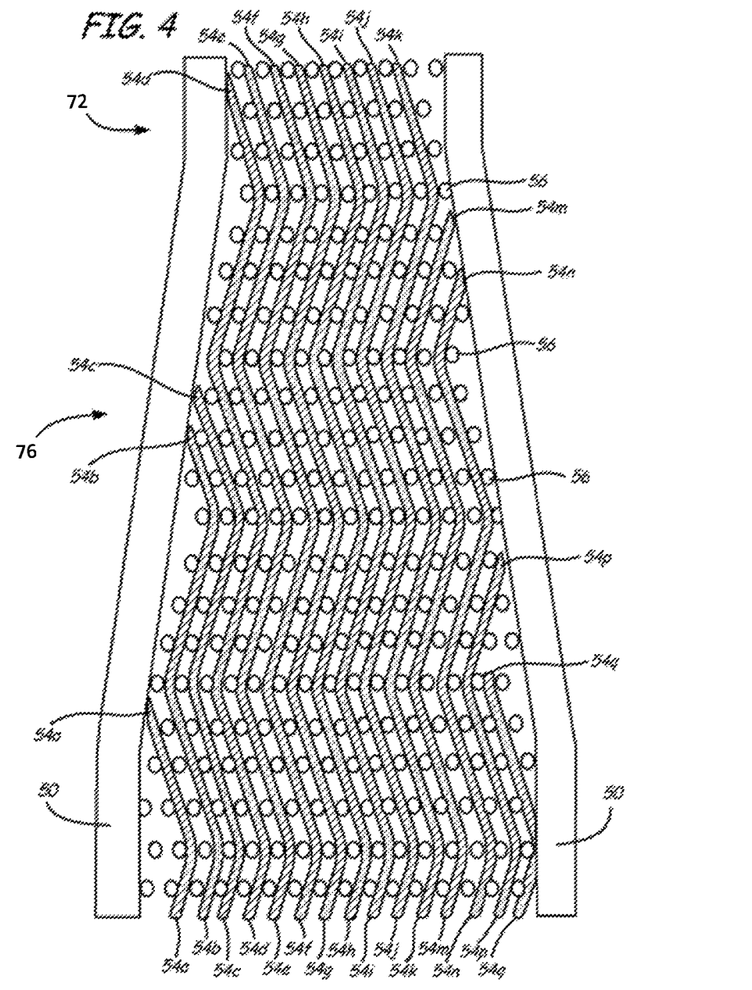
FIG. 4 is an enlarged cross-sectional view of a root of the composite fan blade.

FIG. 4 is a simplified enlarged cross-sectional view of root 76 which shows the details of preform 52. Preform 52 is a three dimensionally integrally woven structure that includes warp yarns 54a through 54q (referred to generally as warp yarns 54) and weft yarns 56. Warp yarns 54 extend in a longitudinal (or spanwise) direction between root 76 and tip 74 of preform 52. Weft yarns 56 are placed at a 90 degree angle to the direction of warp yarns 54 and are aligned in a chordwise direction of preform 52. Weft yarns 56 extend between leading edge 34 and trailing edge 66 of preform 52. Matrix 59 is located in the spaces between the yarns. The preform may further comprise vertical yarns (not shown).

Warp yarns 54 and weft yarns 56 of preform 52 are formed from bundles of fibers. Warp yarns 54 and weft yarns 56 are woven together to form integrally woven three-dimensional preform 52 with a layer-to-layer angle interlock weave pattern. Alternatively, preform 52 can have a through-thickness angle interlock weave pattern or an orthogonal weave pattern. Weft yarns 56 are arranged in columns that extend in the thickness direction (i.e. between pressure side 68 and suction side 70). The columns of weft yarns 56 have a staggered arrangement such that weft yarns 56 are off-set from adjacent weft yarns 56 in the spanwise direction. Alternatively, weft yarns 56 can be aligned with adjacent weft yarns 56 in the spanwise direction and stuffer yarns can extend in the spanwise direction between weft yarns 56.

FIG. 4 illustrates one of several planes that are repeated along the chordwise axis of preform 52 between leading and trailing edges 64 and 66. The other planes are similar to the plane shown expect that warp yarns 54 are shifted in the spanwise direction such that warp yarns 54 and weft yarns 56 are interlocked at different locations on each plane. Plies 50 can be generally the same thickness along blade 62 and preform 52 can be woven to create the desired change in thickness. More specifically, select warp yarns 54 can be removed during the weaving process to reduce the thickness of preform 52. Similarly, yarns can be added to increase the thickness of preform 52 in order to achieve the desired shape of the preform.

While one method of forming a composite fan blade has been described with regard to the use of a preform and plies it is readily understood that other methods are available. The use of a combination of carbon and non-carbon fibers in the fiber composite material allows for greater ductility of the fiber composite material and also more design options to tailor the desired properties. By choosing the type and distribution of the fibers a composite fan blade have superior ductility and strength is available.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, although shown and described herein with respect to vanes and blades, those of skill in the art will appreciate that any type of airfoil or component requiring flow passages and bleed ports may employ embodiments described herein. For example, although described with respect to airfoils of gas turbine engines, those of skill in the art will appreciate that the airfoils are not limited to gas turbine engines, and embodiments described herein may be applied to any type of airfoil that has internal cooling passages. Further, although described and shown with various example geometries and configurations, those of skill in the art will appreciate that variations on the disclosed shapes, geometries, etc. may be made without departing from the scope of the present disclosure. Moreover, although an aero or aircraft engine application is shown and described above, those of skill in the art will appreciate that airfoil configurations as described herein may be applied to industrial applications and/or industrial gas turbine engines, land based or otherwise.

Accordingly, the present disclosure is not to be seen as limited by the foregoing description, but is only limited by the scope of the appended claims.

What is claimed is:

1. A fiber composite material comprising a polymer matrix, carbon fibers having a diameter of 3 to 10 micrometers, and 1.5 volume percent of non-carbon fibers based on the total fiber volume in the fiber composite material, wherein the non-carbon fibers exclude glass fiber and have a strain to failure value greater than the strain to failure value of the carbon fibers.

2. The fiber composite material of claim 1, wherein the non-carbon fiber has a strain to failure value greater than 1.5%.

3. The fiber composite material of claim 1, wherein the non-carbon fiber comprises aramid fibers, hollow polypropylene fibers, polyamide fibers, polyester fibers, or a combination comprising two or more of the foregoing.

4. The fiber composite material of claim 1, wherein the carbon fiber and the non-carbon fiber are combined in a woven fabric, a uniweave, or a three dimensionally woven structure.

5. The fiber composite material of claim 1, wherein polymer matrix comprises an epoxy.

6. The fiber composite material of claim 1, wherein polymer matrix comprises a polyimide.

7. A preform comprising a polymer matrix, carbon fibers, and non-carbon fibers combined in a three dimensionally woven structure having yarns extending in the X, Y and Z directions, wherein the yarns extending in the Z direction comprise non-carbon fibers and the non-carbon fibers exclude glass fibers, have a strain to failure value greater than the strain to failure value of the carbon fibers and are present in an amount of 1 to 5 volume percent, based on the total fiber volume in the preform.

8. The preform of claim 7, wherein the non-carbon fiber has a strain to failure value greater than 1.5%.

9. A fan blade for a jet engine, the fan blade comprising:
a root connected to a blade portion, the blade portion including a leading edge and a trailing edge, wherein the root, the blade portion or both comprise a fiber composite and the fiber composite comprises carbon fibers, non-carbon fibers having a strain to failure value greater than the strain to failure value of the carbon fibers and a polymer matrix and further wherein the non-carbon fibers exclude glass fibers and are present in an amount of 1 to 5 volume percent, based on the total fiber volume in the fan blade.

10. The fan blade for a jet engine of claim 9, wherein the non-carbon fiber has a strain to failure value greater than 1.5%.

11. The fan blade for a jet engine of claim 9, wherein the carbon fiber has a diameter of 3 to 10 micrometers.

12. The fan blade for a jet engine of claim 9, wherein the non-carbon fiber comprises aramid fibers, hollow polypropylene fibers, polyamide fibers, polyester fibers, or a combination comprising two or more of the foregoing.

13. The fan blade for a jet engine of claim 9, wherein the carbon fiber and the non-carbon fiber are be comingled in a yarn, a woven fabric, a uniweave, a three dimensionally woven structure.

14. The fan blade for a jet engine of claim 9, wherein polymer matrix comprises an epoxy.

15. The fan blade for a jet engine of claim 9, wherein polymer matrix comprises a polyimide.

16. The fan blade for a jet engine of claim 9, wherein 30 vol % of the total non-carbon fiber used in the fan blade is located within 10 millimeters of the surface of the fan blade.

* * * * *